(12) United States Patent
Nagaoka et al.

(10) Patent No.: US 8,184,862 B2
(45) Date of Patent: May 22, 2012

(54) VEHICLE PERIPHERY MONITORING APPARATUS

(75) Inventors: Nobuharu Nagaoka, Wako (JP); Hideki Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/936,426

(22) PCT Filed: Jan. 8, 2009

(86) PCT No.: PCT/JP2009/000043
§ 371 (c)(1),
(2), (4) Date: Oct. 5, 2010

(87) PCT Pub. No.: WO2009/130827
PCT Pub. Date: Oct. 29, 2009

(65) Prior Publication Data
US 2011/0064275 A1    Mar. 17, 2011

(30) Foreign Application Priority Data

Apr. 24, 2008 (JP) ................................. 2008-113859

(51) Int. Cl.
*G06K 9/00* (2006.01)
(52) U.S. Cl. ........................................ 382/106; 382/104
(58) Field of Classification Search .......... 382/103–106; 340/148, 435
See application file for complete search history.

(56) References Cited

U.S. PATENT DOCUMENTS

| 7,586,400 B2 | 9/2009 | Nagaoka et al. |
| 2006/0115115 A1* | 6/2006 | Nagaoka et al. .............. 382/103 |
| 2007/0171033 A1* | 7/2007 | Nagaoka et al. .............. 340/435 |

FOREIGN PATENT DOCUMENTS

| JP | 02-279181 | 11/1990 |
| JP | 2001-028050 A | 1/2001 |
| JP | 2005-316607 A | 11/2005 |
| JP | 2007-213561 A | 8/2007 |

OTHER PUBLICATIONS

Lee et al., "Shape Variation-Based Frieze Pattern for Robust Gait Recognition", CVPR '07. IEEE Conference on Computer Vision and Pattern Recognition; Jun. 18-23, 2007; Minneapolis, MN, USA, IEEE, Piscataway, N J, USA, Jun. 1, 2007, pp. 1-8).*

(Continued)

*Primary Examiner* — Vu Le
*Assistant Examiner* — Amara Abdi
(74) *Attorney, Agent, or Firm* — Carrier Blackman & Associates, P.C.; Joseph P. Carrier; William D. Blackman (57) ABSTRACT

Provided is an apparatus capable of, even when an object is moving, measuring the position of the object at a high accuracy. A vehicle periphery monitoring apparatus (10) calculates the change rate (Rate(t)) of the size of an object region between two times separated by a specified interval (ΔT). The specified interval (ΔT) is a time interval defined so that the shapes and postures of an object in images resemble or match each other to such an extent that it is possible to identify that the object is identical. Based on the change rage (Rate(t)) of the size of the object region during the specified interval (ΔT), it is possible to measure the distance from a vehicle (1) to the object or the position at a high accuracy even when the object is moving.

5 Claims, 7 Drawing Sheets

OTHER PUBLICATIONS

Lee et al ("Shape Variation-Based Frieze pattern for Robust Gait Recognition", conference on computer vision and pattern recognition, Jun. 18-23, 2007, Minneapolis, MN, USA, p. 1-8.*

Cutler, R. et al., "Robust Real-Time Periodic Motion Detection, Analysis, and Applications", IEEE Transactions on Pattern Analysis and Machine Intellignece, IEEE Service Center, Los Alamitos, CA US, vol. 22, No. 8, Aug. 1, 2000, pp. 781-796. *sect 1, 3.1, 3.2, 4.2, 4.3, figures 8-10, 15, 23*.

Lee, L. et al., "Learning Pedestrian Models for Silhouette Refinement", Proceedings of the Eight IEEE International Conference on Computer Vision. (ICCV). Nice, Froace, Oct. 13-16, 2003; [International Conference on Computer Vision], Los Alamitos, CA : IEEE Comp. Soc, US, vol. Conf. 9, Oct. 13, 2003, pp. 663-670. *sect. 1, 4.2, sect. 6 par. 1-2 figures 2-3, 5*.

Seungkyu, Lee et al., "Shape Variation-Based Frieze Pattern for Robust Gait Recognition", CVPR '07. IEEE Conference on Computer Vision and Pattern Recognition; Jun. 18-23, 2007; Minneapolis, MN, USA, IEEE, Piscataway, NJ, USA, Jun. 1, 2007, pp. 1-8, *sect. 3.1 and fig. 2*.

Zongyi, Liu et al., "Improved Gait Recognition by Gait Dynamics Normalization", IEEE Transactions on Pattern Analysis and Machine Intelligence, IEEE Service Center, Los Alamitos, CA, US, vol. 28, No. 6, Jun. 1, 2006, pp. 863-876, *p. 864; figure 2*.

* cited by examiner

VEHICLE PERIPHERY MONITORING APPARATUS

PRIORITY CLAIM

The present application is based on and claims the priority benefit of Japanese Patent Application 2008-113859 filed on Apr. 4, 2008, the contents of which are incorporated herein by reference in its entirety.

BACKGROUND OF THE INVENTION

1. Field of the Invention

The present invention relates to a vehicular periphery monitoring apparatus configured to monitor the periphery of a vehicle according to an image acquired from an imaging device mounted in the vehicle.

2. Description of the Related Art

There has been disclosed an art which determines the position of an object such as a pedestrian or the like in real space on the basis of an image captured by a camera mounted in a vehicle at different times and judges the level of contact possibility between the vehicle and the object on the basis of the determination result (for example, refer to Japanese Patent Laid-open No. 2007-213561). Since the relative position of the object with respect to the vehicle changes when the vehicle is moving, by using the changed size of the object in the captured image, the position of the object in real space is determined.

However in case that the object is also moving, the shape or posture of the object will change in the captured image; therefore, the object may be recognized by mistake as a different object, and resultantly, it is possible that the object is ignored as a subject for distance determination.

SUMMARY OF THE INVENTION

The present invention has been accomplished in view of the aforementioned problems, and it is therefore an object of the present invention to provide a vehicular periphery monitoring apparatus capable of determining the position of an object at a high accuracy even when the object is moving.

A first aspect of the present invention provides a vehicular periphery monitoring apparatus configured to monitor a periphery of a vehicle according to an image acquired from a single imaging device mounted in the vehicle to denote the periphery of the vehicle. The vehicular periphery monitoring apparatus of the present invention comprises: a first processing element configured to set a region in the image where an object is present as an object region; and a second processing element configured to calculate a change rate of the size of the object region between two times separated by a specified interval equivalent to a standard motion cycle or half motion cycle of the object and determine a distance from the vehicle to the object according to the specified interval and the change rate of the size of the object region.

According to the vehicular periphery monitoring apparatus of the first aspect of the present invention, the change rate of the size of the object region between two times separated by the specified interval equivalent to a standard motion cycle or half motion cycle of the object is calculated. Thereby, for an object identical to the object in the image of which the posture or shape changes in the specified interval or around the specific interval, namely in the motion cycle or the half motion cycle, the change rate of the size thereof is calculated at a high accuracy. On the basis of the calculated change rate of the size of the object region over the specified interval, the distance or position from the vehicle to the object can be determined at a high accuracy even when the object is moving. Note that the image captured from the imaging device includes not only the captured image itself but also an image obtained after performing an image treatment on the captured image.

A second aspect of the present invention is dependent on the first aspect of the present invention, wherein the first processing element determines the type of the object, and sets the standard motion cycle or half motion cycle of the object retrieved from a storing device as the specified interval on basis of the type of the object.

According to the vehicular periphery monitoring apparatus of the second aspect of the present invention, even when objects of plural types are moving in different motion cycles according to different classified types respectively, the distance or position from the vehicle to each object can be determined at a high accuracy.

A third aspect of the present invention is dependent on the first aspect of the present invention, wherein the first processing element evaluates the degree of correlation between an enlarged object region obtained by enlarging the object region at a first time and the object region at a second time posterior to the first time by the specified interval, and the second processing element calculates the scale of enlargement of the object region at the first time when the degree of correlation is the maximum as the change rate of the size of the object region.

According to the vehicular periphery monitoring apparatus of the third aspect of the present invention, when the degree of correlation between an enlarged object region obtained by enlarging the object region at a first time (hereinafter, referred to as a first object region where appropriate) and the object region at a second time posterior to the first time (hereinafter, referred to as a second object region where appropriate) by the specified interval becomes maximum, the scale of enlargement thereof is calculated as the change rate of the size of the object region. The enlarged object region with the maximum degree of correlation relative to the second object region is equivalent to a predicted or estimated future image of the first object region at the second time with the specified interval elapsed from the first time. As aforementioned, on the basis of the change rate and the specified interval, the distance or position from the vehicle to the object can be determined at a high accuracy even when the object is moving.

A fourth aspect of the present invention is dependent on the first aspect of the present invention, wherein the first processing element evaluates the degree of correlation between each enlarged object region obtained by enlarging the object region at each of plural reference times and the object region at the second time posterior to the plural reference times, and sets a time interval between the first time among the plural reference times where the enlarged object region is obtained with the maximum degree of correlation and the second time among the plural reference times as the specified interval.

According to the vehicular periphery monitoring apparatus of the fourth aspect of the present invention, the degree of correlation between the enlarged object region obtained by enlarging the object region at a reference time (hereinafter, referred to as a reference object region where appropriate) and the reference object region at the second time (hereinafter, referred to as a second object region where appropriate) is evaluated. The time interval between the first time among the plural reference times where the enlarged object region is obtained with the maximum degree of correlation relative to the second object region and the second time is set as the specified interval. According thereto, an object at a time can be recognized identical to the object at a different time, thereby, the specified interval can be defined so that the shapes or postures of the object in images resemble or match each other.

A fifth aspect of the present invention is dependent on the fourth aspect of the present invention, wherein the first processing element sets the time interval between the first time and the second time as the specified interval on a condition that the change rate of the size of the object region between the first time and any of the plural reference times different from the first time is in an allowable range.

According to the vehicular periphery monitoring apparatus of the fifth aspect of the present invention, the time interval between the first time and the second time is defined as the specified interval on a condition that the change rate of the size of the object region between the first time and any of the plural reference times different from the first time is in the allowable range. According thereto, when the change rate of the size of the object region is beyond the allowable range, in other words, despite of the high possibility that different objects are present in the object region at different times, the specified interval will be avoided from being defined according to the change rate of the size of the object region, consequently the accuracy of determining the distance from the vehicle to the object can be prevented from decreasing remarkably.

DETAILED DESCRIPTION OF THE PREFERRED EMBODIMENTS

Hereinafter, a vehicle periphery monitoring apparatus of an embodiment according to the present invention will be described in detail with reference to the drawings.

Figure 1:
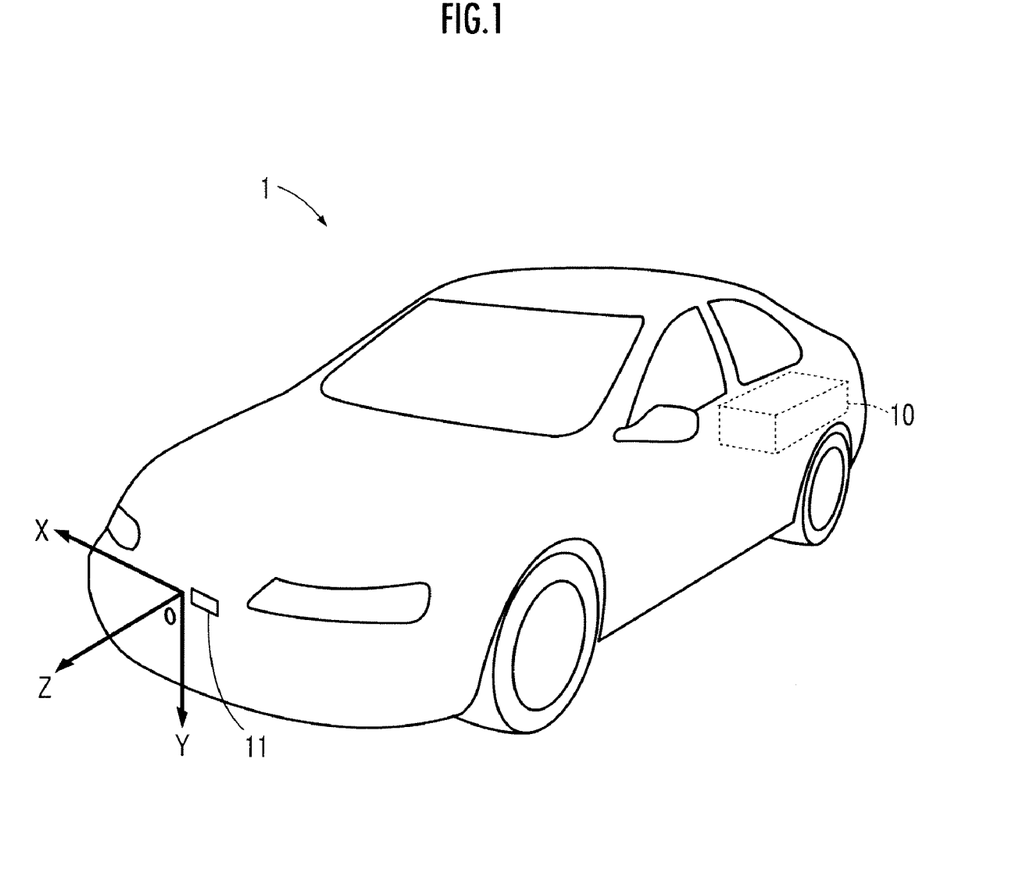
FIG. 1 is a view of a vehicle according to the present invention.

A vehicle (four-wheeled vehicle) 1 illustrated in FIG. 1 is mounted with the vehicle periphery monitoring apparatus 10 and a single infrared camera (imaging device) 11. It is acceptable to use a camera with the sensitivity thereof being adjusted to the other region of wavelength such as visible lights in place of the infrared camera 11 as the imaging device. As illustrated in FIG. 1, a real spatial coordinate system is defined with the origin O at a front portion of the vehicle 1, X axis extending in the lateral direction, Y axis extending in the vertical direction and Z axis extending in the anteroposterior direction of the vehicle 1. The infrared camera 11 is fixed at a front portion of the vehicle 1 for photographing the front side of the vehicle 1.

Figure 2:
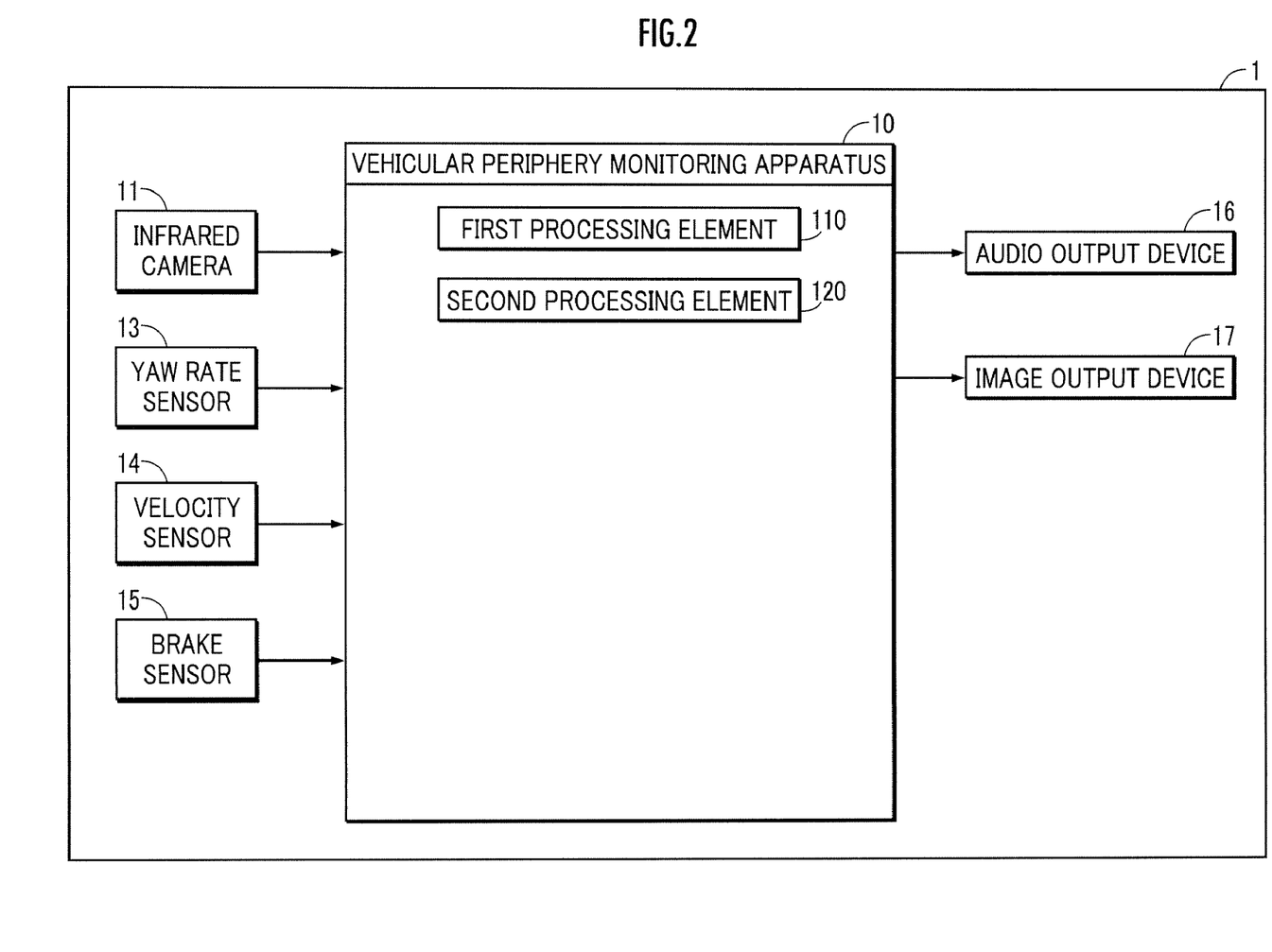
FIG. 2 is a block view of a vehicle periphery monitoring apparatus according to the present invention.

As illustrated in FIG. 2, the vehicle 1 is further mounted with various sensors including a yaw rate sensor 13 for outputting signals according to a yaw rate of the vehicle 1, a velocity sensor 14 for outputting signals according to a velocity thereof, a brake sensor 15 for outputting signals according to the braking state thereof and with a audio output device 16 and an image output device 17. In addition to a HUD (head-up display) displaying an image on the windshield of the vehicle 1, a travel-display device for displaying the travel conditions of the vehicle 1, a display device included in a navigation apparatus or the like may be used as the image output device 17.

The vehicle periphery monitoring apparatus 10 is configured to monitor the periphery of the vehicle 1 according to an image acquired from the infrared camera 11. The vehicle periphery monitoring apparatus 10 is comprised of a computer (composed of a CPU, a ROM, a RAM and electronic circuit such as an I/O circuit, an A/D conversion circuit and the like). The analog signals output from the infrared camera 11, the yaw rate sensor 13, the vehicular velocity 14, the brake sensor 15 and the like are converted by the A/D conversion circuit into digital data and the digital data are input to the vehicle periphery monitoring apparatus 10. According to the input digital data and a vehicle periphery monitoring program stored in memory, the computer performs a series of processes such as recognizing the presence of an object such as a human being or another vehicle, determining the contact possibility between the vehicle 1 and the recognized object, and on the basis of the determination result, outputting audio voices from the audio output device 16 or outputting an image from the image output device 17. Note that the program may be distributed or broadcasted from a server via a network or satellite broadcasting to the vehicular computer at an arbitrary timing or may be preliminarily installed in a memory device such as the RAM of the vehicular computer. The vehicle periphery monitoring apparatus 10 may be composed of a single ECU or by a distribution control system constructed by a plurality of ECU.

The vehicle periphery monitoring apparatus 10 illustrated in FIG. 2 is provided with a first processing element 110 and a second processing element 120. The first processing element 110 is configured to set a region in the image where an object is present as an object region. The image acquired by the infrared camera 11 denotes the periphery of the vehicle 1. The second processing element 120 is configured to calculate a change rate of the size of the object region between two times separated by a specified interval (to be described hereinafter) and determine a distance from the vehicle 1 to the object according to the specified interval and the change rate of the size of the object region.

Functions of the vehicle 1 and the vehicle periphery monitoring apparatus 10 with the configurations above will be described hereinafter.

First, the first processing element 110 sets the object region according to an image acquired by the infrared camera 11. Specifically, an infrared image obtained from the output signals from the infrared camera 11 is subjected to A/D conversion to generate a gray scale image (FIG. 3/S002).

Figure 3:
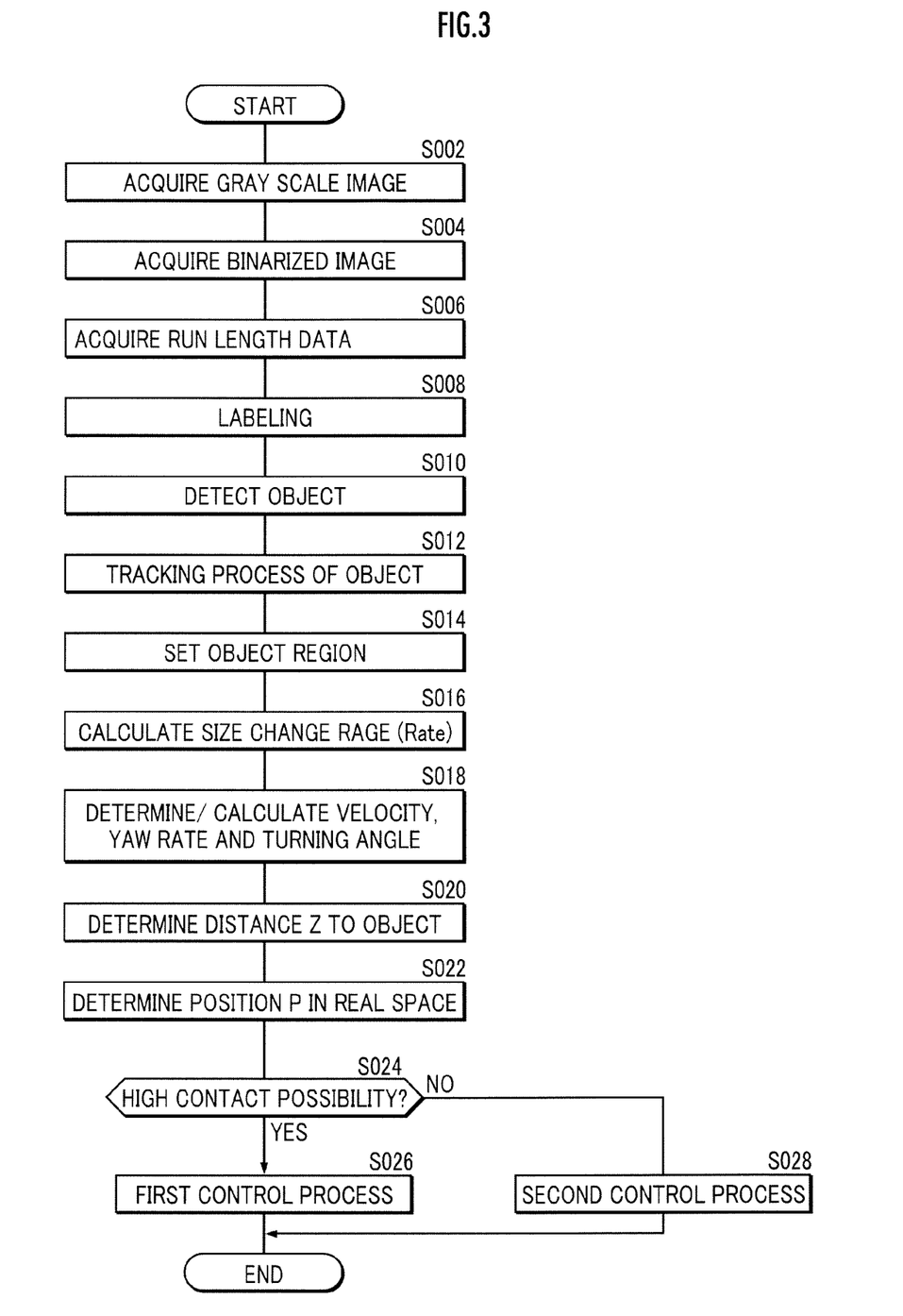
FIG. 3 is a flow chart illustrating functions of the vehicle periphery monitoring apparatus according to the present invention.

Thereafter, the gray scale image is subjected to a binarization process to generate a binarized image (FIG. 3/S004). The binarization process classifies each pixel in the gray scale image into "1" (white) or "0" (black) according to whether or not the luminance thereof is equal to or greater than a threshold. The gray scale image and the binarized image are stored in different image memories.

Subsequently, the group of pixels classified to "1" with high luminance region in the binarized image are classified into lines extending in the lateral direction (x direction) with a width of one pixel in the vertical direction (y direction) of the image, and each line is converted to a run length datum having a coordinate denoting a position of the line (2-dimensional position in the image) and a length thereof (number of pixels) (FIG. 3/S006).

Among the lines denoted by the run length datum, the lines in a group overlapped in the vertical direction of the image are tagged with a label (identifier) (FIG. 3/S008), and the line group is detected as the object (FIG. 3/S010).

Figure 4:
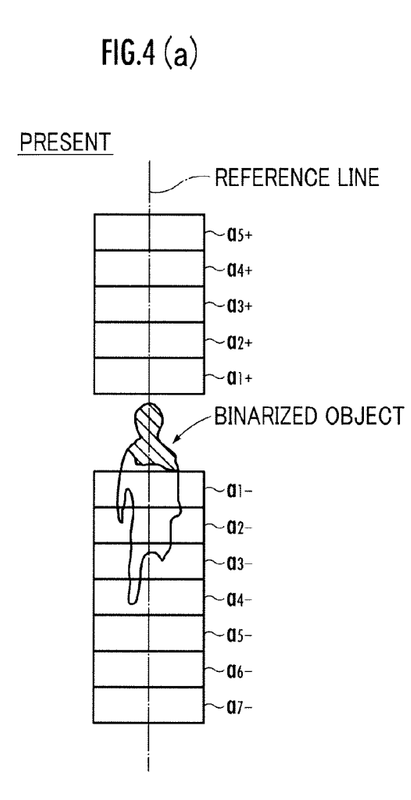
FIG. 4 is an explanatory view related to the setting of an object region.

Accordingly, as illustrated in FIG. 4(a), an object (binarized object) denoted by slashed lines in the binarized image is detected. In addition to a creature such as a human being (pedestrian) or the like, an artificial article such as another vehicle or the like can be recognized as an object. Moreover, plural local portions of an identical subject may also be recognized as an object.

Thereafter, the first processing element 110 performs a tracking process of the object, namely a process of determining whether or not the detected object is identical every arithmetic computation cycle (FIG. 3/S012). For example, by the usage of the approach disclosed in Japanese Patent Laid-open No. 2001-6096, the shape or size of objects detected from the binarized images at time k−1 and time k respectively is performed according to the distribution correlation of luminance in the gray scale image. When the objects are determined to be identical, the label of the object at time k is modified with the same label as the label of the object at time k−1.

Then, the first processing element 110, on the basis of the position of the gravity center of the object and the disposition behavior of a circumscribed quadrangle of the object in the binarized image, defines a region denoting the object as the object region in the gray scale image (FIG. 3/S014).

Specifically, first, a plurality of masks are defined to be disposed in the gray scale image denoting the periphery of the vehicle 1 at the present time k with the object as a reference. For example, as illustrated in FIG. 4(a), a plurality of defined rectangular masks $a_{i+}$ (i=1, 2, ... ) and $a_{j-}$ (j=1, 2, ... ) are lined up in the vertical direction of the object denoted by slashed lines. The plurality of masks are disposed to be centered at the reference line (chain line) which passes through the gravity center or the center of the object and extends in the vertical direction of the image. Then, masks with the correlation equal to or greater than a threshold between the plural masks $a_{i+}$ and $a_{j-}$ in the gray scale image denoting the periphery of the vehicle 1 at a previous time k−1 are searched.

Consequently, a region containing the object and a continuous mask with the positional relationship of the object (or the reference line) at the present time k identical to or substantially identical to that at the previous time k−1 among the plural masks is defined as the object region at each time. For example, as illustrated in FIG. 4(b), the double-framed rectangular region containing the object and masks of $a_{1-}$ to $a_{4-}$ disposed continuously below the object is defined as the object region.

Thereafter, the second processing element 120 calculates the change rate (Rate) of the size of the object region (expressed by the vertical width and the lateral width of the object region, or the area thereof) (FIG. 3/S016).

Specifically, first, an enlarged object region EA is obtained by enlarging the object region (the first object region) $A(t_1)$ at the first time $t_1$. For example, as illustrated in the upper section of FIG. 5, the first object region $A(t_1)$ is enlarged by a plurality of rates $\gamma_1, \ldots, \gamma_i, \ldots, \gamma_n$ ($\gamma_1 < \ldots < \gamma_i < \ldots < \gamma_n$), respectively, to give the enlarged object regions $EA(\gamma_1), \ldots, EA(\gamma_i), \ldots, EA(\gamma_n)$ illustrated in the middle section of FIG. 5.

Then, the correlation between each of the plurality of the enlarged object regions EA and the object region (the second object region) $A(t_2)$ at the second time $t_2$ posterior to the first time $t_1$ is evaluated, and the scale of enlargement by enlarging the first object region $A(t_1)$ into the enlarged object region EA with the maximum correlation to the second object region $A(t_2)$ is calculated as the change rate (Rate (t), where $t=t_2$) of the size of the object region A. For example, among the enlarged object regions $EA(\gamma_1), \ldots, EA(\gamma_i), \ldots, EA(\gamma_n)$ illustrated in the middle section of FIG. 5, the enlarged object region $EA(\gamma_i)$ has the max correlation to the second object region $A(t_2)$, therefore, the scale of enlargement $\gamma_i$ thereof is calculated as the change rate (Rate (t)>1) of the size of the object region A.

It is also acceptable that the second object region $A(t_2)$ is reduced by a plurality of reduction rates, respectively, to give a plurality of reduced object regions; among the plurality of reduced object regions, the reciprocal of the reduction rate reducing the second object region into a reduced object region with the maximum correlation to the first object region $A(t_1)$ is calculated as the change rate (Rate (t)>1) of the size of the object region A.

The first time $t_1$ is anterior to the second time $t_2$ by the specified interval $\Delta T$. The specified interval $\Delta T$ is a time interval defined so that the shapes or postures of an object in images resemble or match each other to such an extent that it is possible to identify that the object is identical. Specifically, when the object is a human being, the specified interval $\Delta T$ is defined to mach a standard walking cycle or half walking cycle of a human being.

Figure 6:
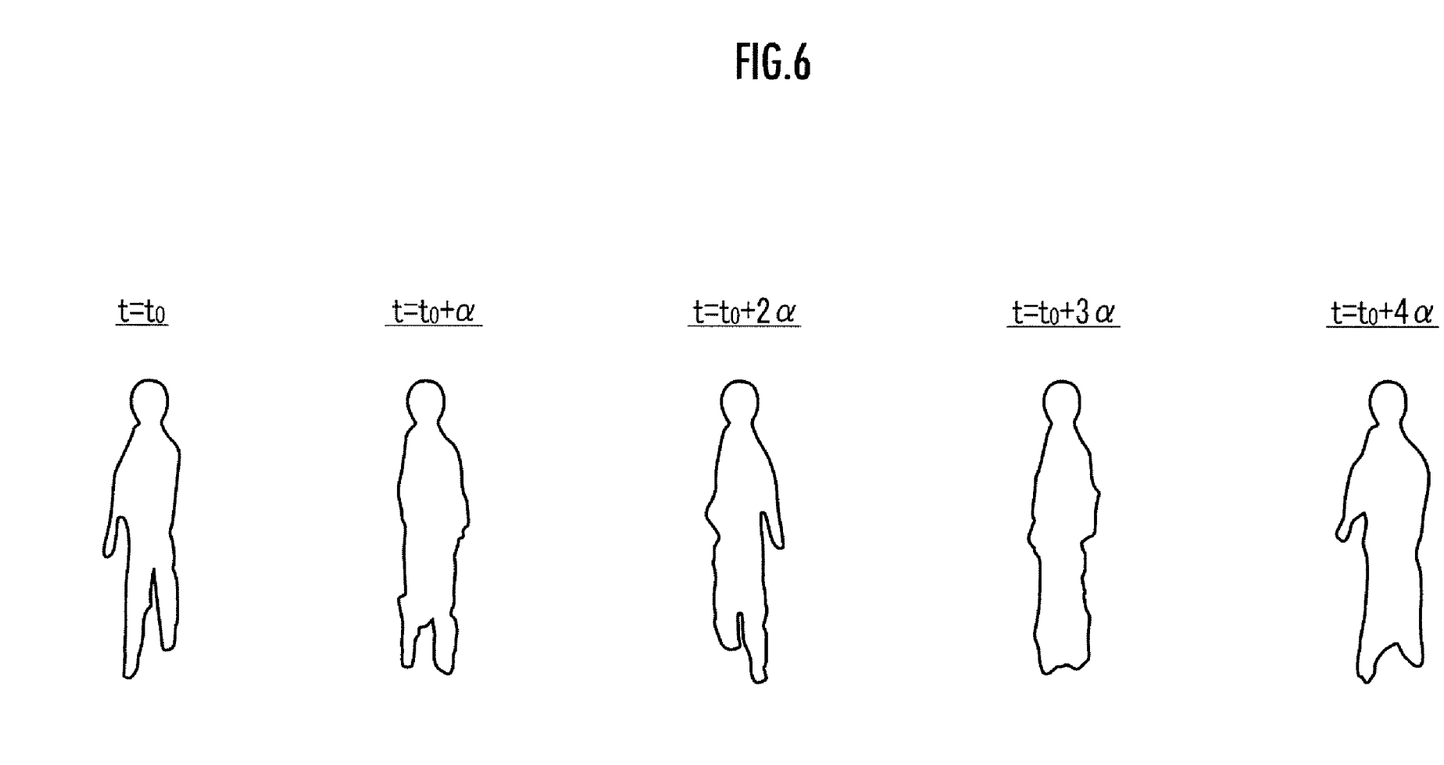
FIG. 6 is an explanatory view related to a specified interval.

For example, for a human being (facing frontally) recognized as an object in the image illustrated in FIG. 6, the shape or posture thereof changes from $t=t_0, t_0+\alpha, t_0+2\alpha, t_0+3\alpha, t_0+4\alpha$ ($\alpha>0$), the time interval "$4\alpha$" between $t=t_0$ and $t=t_0+4\alpha$ where the shape or posture thereof is substantially identical is defined as the specified interval and the specified interval is stored in memory.

Figure 7:
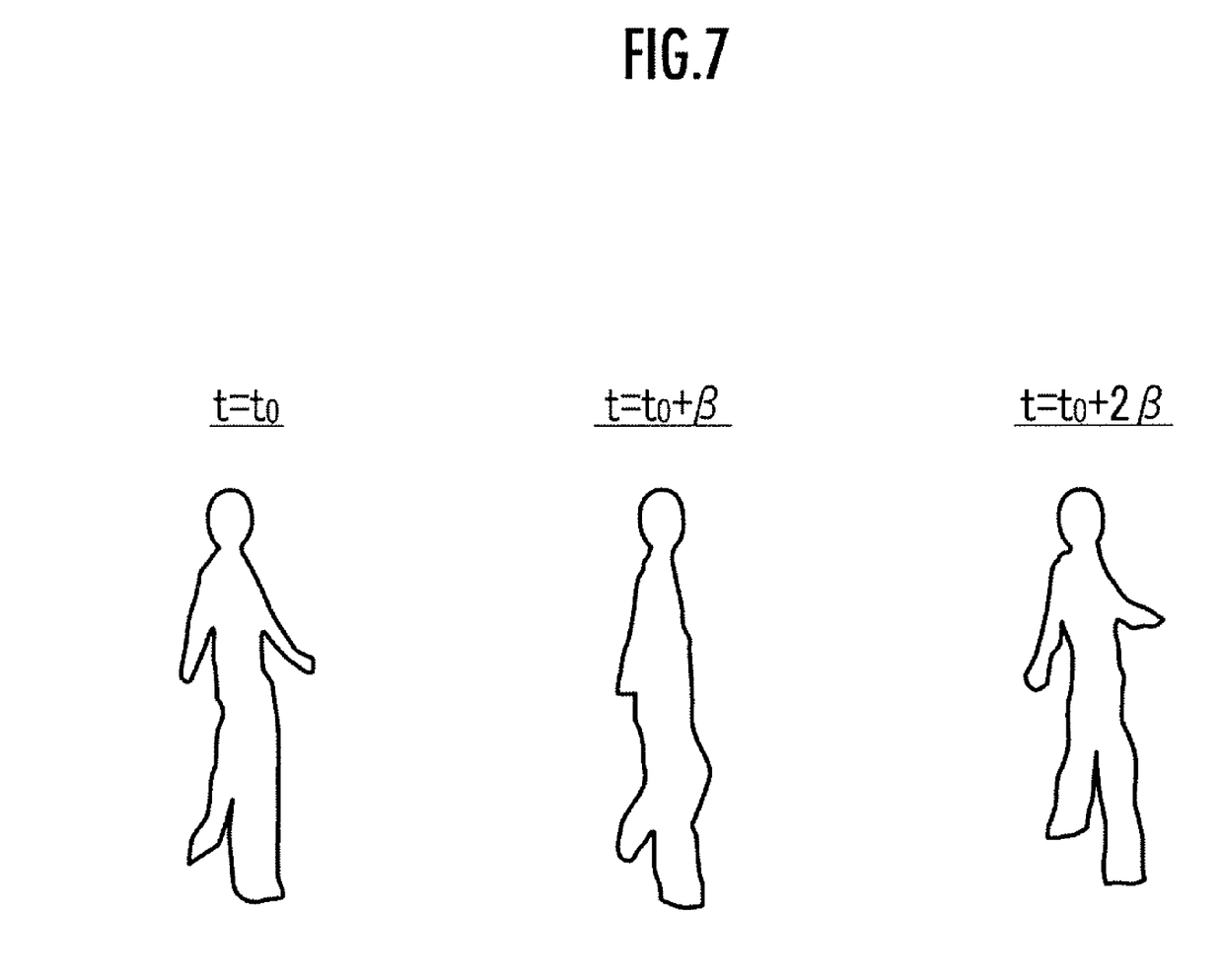
FIG. 7 is an explanatory view related to the specified interval.

Moreover, for example, for a human being (facing laterally) recognized as an object in the image illustrated in FIG. 7, the shape or posture thereof changes from $t=t_0, t_0+\beta, t_0+2\beta$ ($\beta>0$), the time interval "$2\beta$" between $t=t_0$ and $t=t_0+2\beta$ where the shape or posture thereof is substantially identical is defined as the specified interval and the specified interval is stored in memory.

Subsequently, the velocity and the yaw rate of the vehicle 1 are determined according to the respective output from the yaw rate sensor 13 and the velocity sensor 14, and the turning angle (azimuth angle) of the vehicle 1 is calculated by integrating the determination result of the yaw rate (FIG. 3/S018).

In comparison with the velocity v(t) of the vehicle 1, the velocity of the object is too small to be ignored; therefore, the distance Z(t) from the vehicle 1 to the object is determined according to the change rate (Rate(t)), the velocity v(t) of the vehicle 1 and the specified interval $\Delta T$ by using the expression (1) (FIG. 3/S020).

$$Z(t)=\text{Rate}(t)v(t)\Delta T/(1-\text{Rate}(t)) \quad (1)$$

Then, the vehicle periphery monitoring apparatus 10 calculates the real spatial position of the object as P(t)=(X(t), Y(t), Z(t)) according to the distance Z(t) from the vehicle 1 to the object (FIG. 3/S022).

Specifically, the X coordinate X(t) and the Y coordinate Y(t) of the object in the real spatial coordinate system are calculated according to the corrected distance Z(t) from the vehicle 1 to each object, the focal distance f of the infrared camera 11, and the coordinates x(t) and y(t) of each region in the image coordinate system corresponded to each object in the captured image by using the expression (2). The central point, the right direction and the downward direction of the captured image are defined as the origin o, +x direction and +y direction of the image coordinate system, respectively. Thereafter, the real spatial position (X(t), Y(t), Z(t)) is corrected by the turning angle determined from the output of the yaw rate sensor 13.

$$X(t)=x(t)\cdot Z(t)/f$$

$$Y(t)=y(t)\cdot Z(t)/f \quad (2)$$

On the basis of the real spatial position P(t) of each object at different times, the level or the presence of contact possibility between the vehicle and each object is determined according to the determination approach on collision possibility disclosed in, for example, Japanese Patent Laid-open No. 2001-6096 (FIG. 3/S024).

If it is determined that the level of contact possibility between the vehicle 1 and an object is high (FIG. 3/S024 . . . YES), a first control process is performed (FIG. 3/S026). Specifically, an audio voice and an image (a frame or the like emphasizing the object) are output through the audio output device 16 and the image output device 17, respectively, according to the determination result of the contact possibility. It is acceptable to output only the audio voice or only the image.

When the vehicle 1 is traveling with a part of or the entire part of a steering device, a braking device and an accelerating device operated by an actuator, the vehicle 1 is controlled in addition to or in place of outputting an audio voice and an image. Specifically, a part of or the entire part of the steering device, the braking device and the accelerating device of the vehicle 1 may be controlled by a vehicle control unit (not shown) to avoid contacting or to be easy to avoid contacting with an object which is determined to have a high contact possibility of contacting with the vehicle 1.

For example, the accelerating device is controlled hard to make acceleration when there is a contact possibility by making the stepping force needed to step down the accelerator pedal greater than the normal case where there is no need to avoid contacting with an object. Further, the steering device is controlled so that the steering wheel is easy to be wheeled with a smaller force to a wheeling side than to the opposite side in order to avoid contact between an object and the vehicle 1. Furthermore, the braking force of the vehicle 1 in relation to the stepped amount of the braking pedal of the braking device is controlled to be increased faster than in normal cases. According thereto, the driving of the vehicle 1 is made easier to avoid contacting with an object.

The first control process may be performed on a condition that the brake of the vehicle 1 has been confirmed not to be operated by a driver according to the output from the brake sensor 15, or the deceleration of the vehicle 1 has been confirmed to be equal to or smaller than a threshold according to the output from the velocity sensor 14 or an acceleration sensor (not shown).

If it is determined that the level of contact possibility between the vehicle 1 and an object is low (FIG. 3/S024 . . . NO), a second control process is performed (FIG. 3/S028).

Specifically, an audio voice and an image different from those generated in the first control process are output through the audio output device 16 and the image output device 17, respectively, according to the determination result of the contact possibility. The vehicle 1 is controlled with forces weaker than the forces generated in the first control process. The second control process may be omitted.

According to the vehicle periphery monitoring apparatus 10 with the functions mentioned above, the change rate (Rate (t)) of the size of the object region between two times separated by the specified interval ΔT (refer to FIG. 3/S016).

Figure 5:
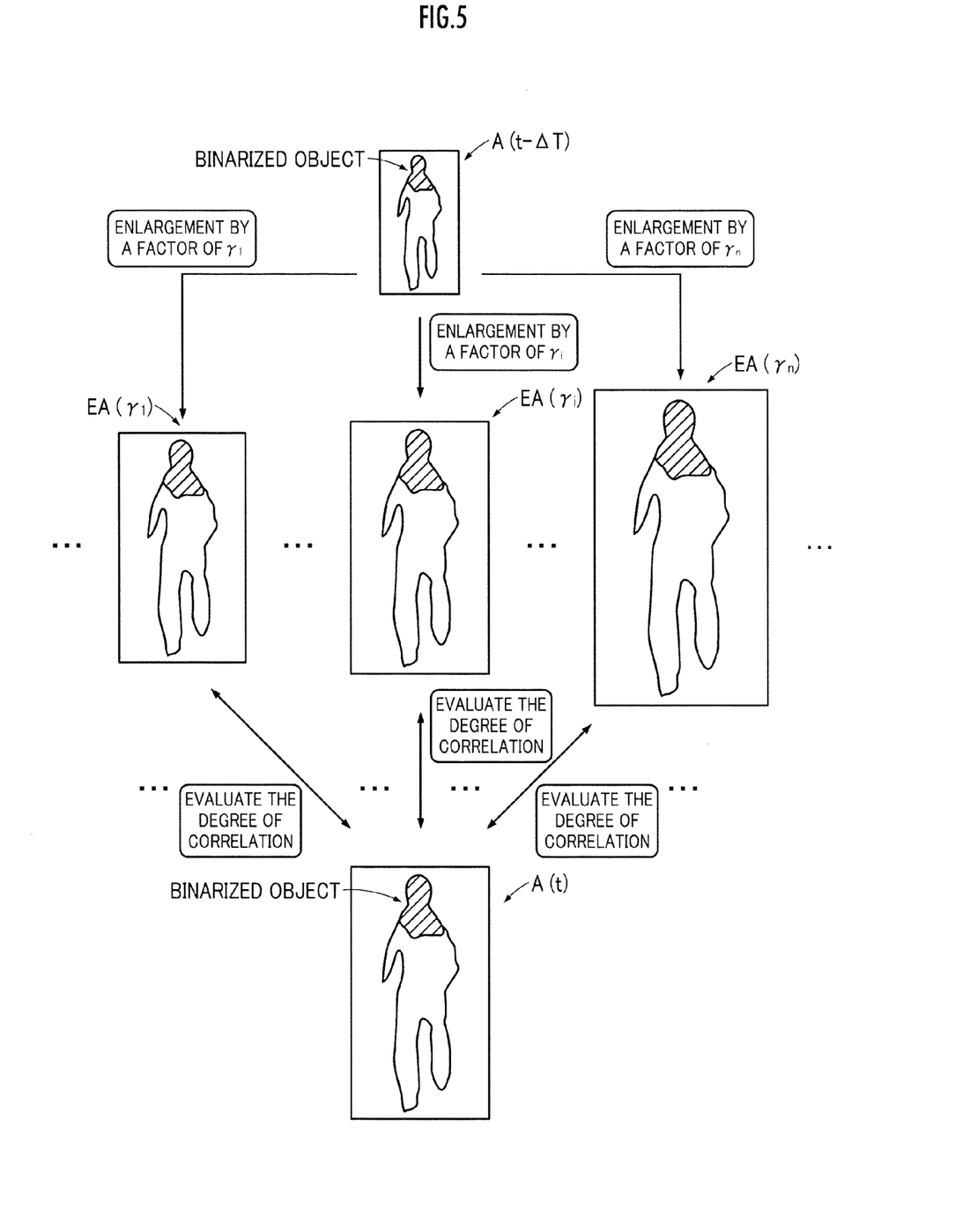
FIG. 5 is an explanatory view related to the calculation of the change rate of the size of the object region.

Specifically, the enlarged object region EA(γ$_i$) obtained by enlarging an object region (the first object region) A(t$_1$) at the first time t$_1$ has the maximum correlation to an object region (the second object region) A(t$_2$) at the second time t$_2$ posterior to the first time t$_1$ by the specified interval ΔT, therefore, the scale of enlargement thereof is calculated as the change rate (Rate (t)) of the size of the object region A (refer to FIG. 5). The enlarged object region EA(γ$_i$) with the maximum correlation to the second object region A(t$_2$) is equivalent to a predicted or estimated future image of the first object region A(t$_1$) at the second time t$_2$ after the specified interval ΔT elapsed from the first time t$_1$.

The specified interval ΔT is a time interval defined so that the shapes or postures of an object in images resemble or match each other to such an extent that it is possible to identify that the object is identical. Specifically, when the object is a human being, the specified interval ΔT is defined to mach a standard walking cycle (roughly 1 second) or half walking cycle of a human being (refer to FIG. 6 and FIG. 7). Thereby, the change rate (Rate(t)) of a size of an object identical to the object in the image which is moving with the posture or shape thereof varying with the specified interval ΔT or a time interval around the specified interval ΔT as a cycle can be calculated at high accuracy. On the basis of the change rate (Rate (t)) of the size of the object region over the specified interval ΔT, even though the object is moving, the distance Z(t) from the vehicle 1 to the object or the position P(t) can be determined at high accuracy (refer to FIG. 3/S020 and S022, FIG. 5).

It is acceptable that the first processing element 110 determines the type of an object and sets a standard motion cycle or half motion cycle retrieved from a storing device according to the type of the object as the specified interval. For example, the type of an object may be determined according to an approach such as matching the shape of an object in a binarized image with a plurality of shape patterns stored in the storing device. According thereto, even though plural types of objects (animals such as a human being and a deer) are moving at different motion cycles in accordance with the types thereof, the distance or position from the vehicle 1 to the object of each type can be determined at high accuracy.

It is acceptable that the first processing element 110 evaluates the correlation between each enlarged object region obtained by enlarging each object region at each of plural reference times and an object region at a second time posterior to the plural reference times, and sets a time interval between the second time t$_2$ and a first time t$_1$ of the plural reference times where the enlarged object region has the maximum correlation at the specified interval ΔT. According thereto, the specified interval ΔT can be defined so that the shapes or postures of an object in images resemble or match each other to such an extent that it is possible to identify that the object between two different times is identical (refer to FIG. 6 and FIG. 7).

It is also acceptable that the first processing element 110 defines the time interval between the first time t$_1$ and the second time t$_2$ as the specified interval ΔT on a condition that the change rate of the size of the object region between the first time t$_1$ and a reference time different from the first time t$_1$ in the allowable range. According thereto, when the change rate of the size of the object region is beyond the allowable range, in other words, despite of the high possibility that different objects are present in the object region at different times, the specified interval will be avoided from being defined according to the change rate of the size of the object region, consequently the accuracy of determining the distance from the vehicle 1 to the object can be prevented from decreasing remarkably.

What is claimed is:

1. A vehicular periphery monitoring apparatus configured to monitor a periphery of a vehicle according to an image acquired from a single imaging device mounted in the vehicle to denote the periphery of the vehicle, comprising:
a first processing element configured to:
set a region in the image where an object is present as an object region;
determine the type of the object;
retrieve a motion cycle time corresponding to the object from a storing device;
and set the motion cycle time as a specified interval; and
a second processing element configured to:
calculate a change rate of the size of the object region between two times separated by the specified interval; and
determine a distance from the vehicle to the object according to the specified interval and the change rate of the size of the object region,
wherein the object preforms movement that changes a shape or a posture thereof cyclically according to the motion cycle time, wherein the motion cycle time corresponds to a length of time in which it takes an object a transform between a first shape or posture, one or more interim shapes or postures, and a return to the first shape or posture.

2. A vehicular periphery monitoring apparatus configured to monitor a periphery of a vehicle according to an image acquired from a single imaging device mounted in the vehicle to denote the periphery of the vehicle, comprising:
a first processing element configured to:
set a region in the image where an object is present as an object region;
evaluate the degree of correlation between each enlarged object region obtained by enlarging the object region at each of plural reference times and the object region at the second time posterior to the plural reference times;
calculate a motion cycle time based on a time interval between the first time among the plural reference times where the enlarged object region is obtained with the maximum degree of correlation and the second time among the plural reference times, and
set the motion cycle time as a specified interval; and
a second processing element configured to:
calculate a change rate of the size of the object region between two times separated by the specified interval equivalent to a standard motion cycle or a half motion cycle of the object; and
determine a distance from the vehicle to the object according to the specified interval and the change rate of the size of the object region,
wherein the object preforms movement that changes a shape or a posture thereof cyclically according to the motion cycle time, wherein the motion cycle time corresponds to a length of time in which it takes an object a transform between a first shape or posture, one or more interim shapes or postures, and a return to the first shape or posture.

3. The vehicular periphery monitoring apparatus according to claim 2, wherein the first processing element sets the time interval between the first time and the second time as the specified interval on a condition that the change rate of the size of the object region between the first time and any of the plural reference times different from the first time is in an allowable range.

4. A vehicular periphery monitoring apparatus configured to monitor a periphery of a vehicle according to an image acquired from a single imaging device mounted in the vehicle to denote the periphery of the vehicle, comprising:
a first processing element configured to:
set a region in the image where an object is present as an object region;
determine the type of the object;
retrieve a motion cycle time corresponding to the object from a storing device;
and set the motion cycle time as a specified interval; and
a second processing element configured to:
calculate a change rate of the size of the object region between two times separated by the specified interval; and
determine a distance from the vehicle to the object according to the specified interval and the change rate of the size of the object region,
wherein the object preforms movement that changes a shape or a posture thereof cyclically according to the motion cycle time, wherein the motion cycle time corresponds to half the amount of a length of time in which it takes an object a transform between a first shape or posture, one or more interim shapes or postures, and a return to the first shape or posture.

5. A vehicular periphery monitoring apparatus configured to monitor a periphery of a vehicle according to an image acquired from a single imaging device mounted in the vehicle to denote the periphery of the vehicle, comprising:
a first processing element configured to:
set a region in the image where an object is present as an object region;
evaluate the degree of correlation between each enlarged object region obtained by enlarging the object region at each of plural reference times and the object region at the second time posterior to the plural reference times;
calculate a motion cycle time based on a time interval between the first time among the plural reference times where the enlarged object region is obtained with the maximum degree of correlation and the second time among the plural reference times, and
set the motion cycle time as a specified interval; and
a second processing element configured to:
calculate a change rate of the size of the object region between two times separated by the specified interval equivalent to a standard motion cycle or a half motion cycle of the object; and
determine a distance from the vehicle to the object according to the specified interval and the change rate of the size of the object region,
wherein the object preforms movement that changes a shape or a posture thereof cyclically according to the motion cycle time, wherein the motion cycle time corresponds to half the amount of a length of time in which it takes an object a transform between a first shape or posture, one or more interim shapes or postures, and a return to the first shape or posture.

* * * * *